United States Patent [19]
Spencer et al.

[11] Patent Number: 5,843,231
[45] Date of Patent: Dec. 1, 1998

[54] APPARATUS FOR BUBBLE STRIPPING AND COATING A FIBER

[75] Inventors: Robert A. Spencer; David C. Lam, both of Roanoke; Duane A. Felton, Moneta, all of Va.

[73] Assignee: Alcatel Telecommunications Cable, Claremont, N.C.

[21] Appl. No.: 718,776

[22] Filed: Sep. 24, 1996

[51] Int. Cl.[6] ............................................ B05C 3/12
[52] U.S. Cl. .................. 118/420; 118/50; 118/405; 425/113; 425/131.1; 425/815; 264/85; 65/443; 65/447; 65/529; 65/530
[58] Field of Search ............................. 118/50, 405, 420; 425/113, 131.1, 815; 427/117, 163.2, 314, 297; 264/85; 65/443, 447, 529, 530

[56] References Cited

U.S. PATENT DOCUMENTS

| | | | |
|---|---|---|---|
| 2,252,689 | 8/1941 | Bradshaw ................................ | 264/85 |
| 2,605,502 | 8/1952 | Culpepper et al. ...................... | 264/85 |
| 3,869,235 | 3/1975 | Moore ..................................... | 425/113 |
| 4,030,901 | 6/1977 | Kaiser .................................... | 264/85 |
| 4,040,807 | 8/1977 | Midwinter et al. . | |
| 4,374,161 | 2/1983 | Geyling et al. . | |
| 4,409,263 | 10/1983 | Aloisio, Jr. et al. . | |
| 4,439,467 | 3/1984 | Kassahun et al. . | |
| 4,474,830 | 10/1984 | Taylor .................................... | 427/54.1 |
| 4,480,898 | 11/1984 | Taylor .................................... | 350/96.3 |
| 4,531,959 | 7/1985 | Kar et al. ................................ | 65/3.11 |
| 4,533,570 | 8/1985 | Iyengar . | |
| 4,613,521 | 9/1986 | Smith, Jr. . | |
| 4,644,898 | 2/1987 | Jochem et al. . | |
| 4,688,515 | 8/1987 | Rosebrooks ............................. | 118/420 |
| 4,704,307 | 11/1987 | Jochem et al. . | |
| 4,765,271 | 8/1988 | Jochem et al. .......................... | 118/420 |
| 4,792,347 | 12/1988 | Deneka et al. . | |
| 5,062,687 | 11/1991 | Sapsford . | |
| 5,127,361 | 7/1992 | Matsuda et al. . | |
| 5,588,997 | 12/1996 | Lysson et al. ........................... | 118/420 |

FOREIGN PATENT DOCUMENTS 2113574  8/1983  United Kingdom .

OTHER PUBLICATIONS

"Cooling and Bubble–Free Coating of Optical Fibers at a High Drawing Rate", Jochem and Van Der Ligt, Journal of Lightwave Technology, Jul. 1986, vol. LT–4, No. 7, pp. 739–742.
"Method For Cooling and Bubble–Free Coating of Optical Fibres at High Drawing Rates", Jochem and Van der Ligt, Electronic Letters (1985), vol. 21, No. 18, pp. 786–787.

Primary Examiner—Peter Chin
Assistant Examiner—Michael P. Colaianni
Attorney, Agent, or Firm—Ware, Fressola, Van Der Sluys & Adolphson LLP

[57] ABSTRACT

A bubble stripping and coating apparatus for stripping entrained gas from the surface of a fiber, then coating the fiber with a coating material having a bubble stripping and coater body and a die assembly. The bubble stripping and coater body has a bubble stripping gas entrance for providing a bubble stripping argon gas to a bubble stripping gas chamber for stripping entrained gas from the fiber and having a die assembly bore. The die assembly is arranged in the die assembly bore, and has a guide die having a lower guide die opening with a diameter of less than 0.016 inches.

19 Claims, 6 Drawing Sheets

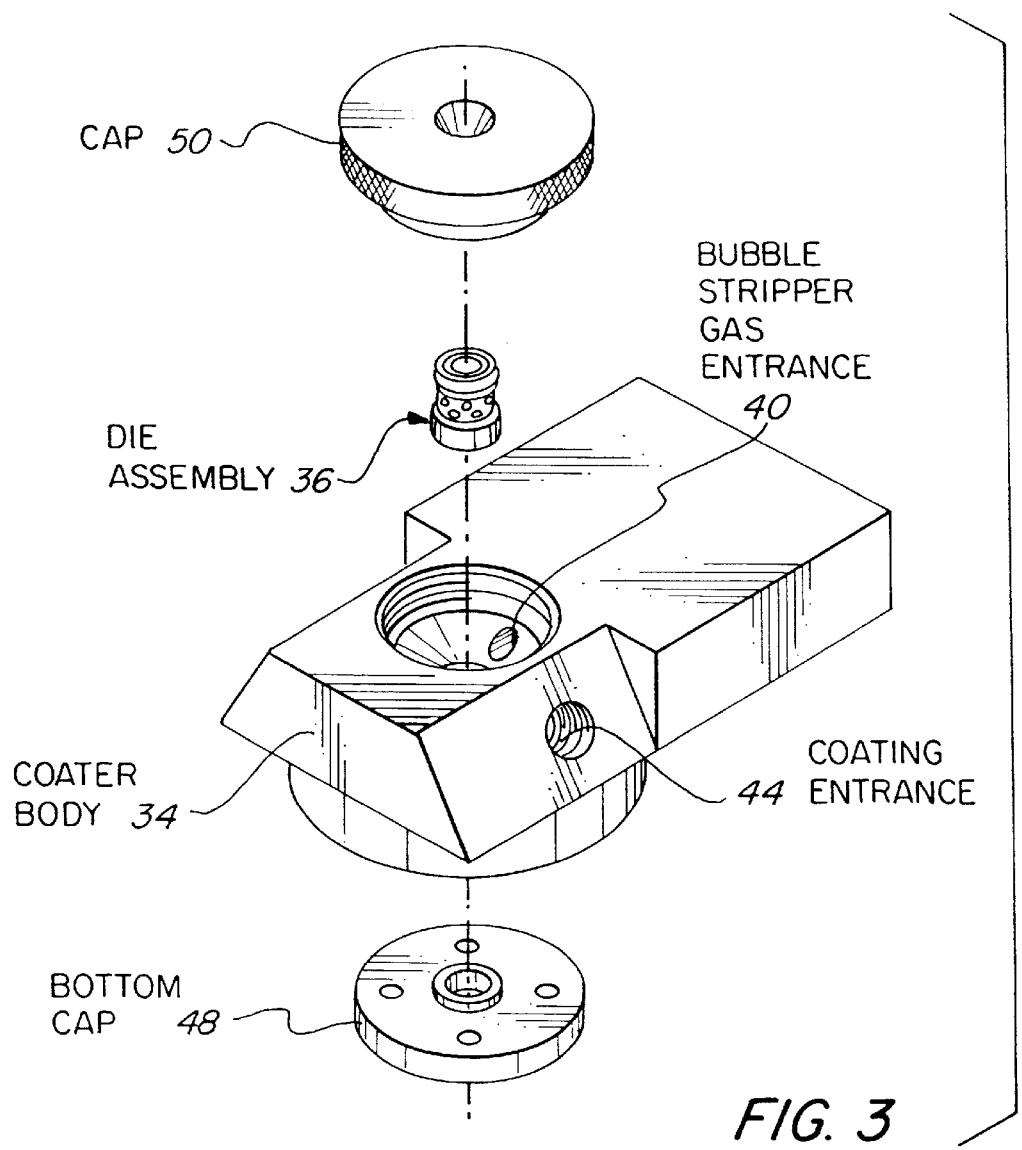
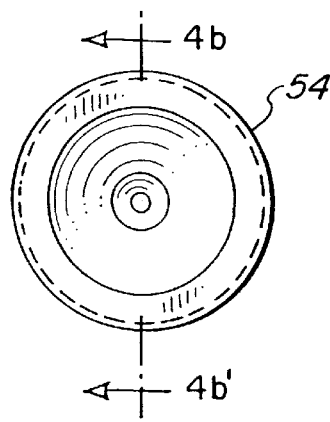
FIG. 4(a)
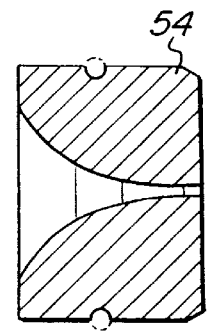
FIG. 4(b)

APPARATUS FOR BUBBLE STRIPPING AND COATING A FIBER

BACKGROUND OF THE INVENTION

1. Field of the Invention

The present invention relates to a bubble stripping and coating device for an optical fiber.

2. Description of the Prior Art

There are many known bubble stripping and coating devices for an optical fiber. Some examples include the following: U.S. Pat. No. 4,040,807 discloses an apparatus for drawing dielectric optical waveguides having a double crucible with an inner compartment 6 and an outer compartment 7 positioned within a furnace wall 9. The ends of the furnace are closed off with plates 15 and 20 and O-rings 14 and 19, as shown in FIG. 2. Bubble formation in the drawn dielectric is eliminated by excluding oxygen from the atmosphere surrounding the double crucible and surrounding it with an inert gas such as carbon dioxide, nitrogen, or argon.

U.S. Pat. Nos. 4,644,898; 4,704,307 and 4,765,271 all disclose a device for pressurized coating of optical fibers. For example, U.S. Pat. No. 4,644,898 in FIG. 2 shows a coating device 11 for coating a fiber F, having a guide duct 59 with a pressurized chamber 61, a tubular member 55 and a restricted inlet opening 57 completely filled with coating material forming a convex meniscus D. The bubble stripping is performed by providing a flushing gas having a kinematic viscosity lower than air above the meniscus D, including argon, xenon, and freon. FIG. 3 shows a mechanism for adjusting the position of the tubular member 55 in a radial direction.

U.S. Pat. No. 4,792,347 discloses a bubble stripping and coating device for making optical fibers which uses carbon dioxide as a bubble stripping gas. The device shown in FIG. 2 has a liquid coating die 12 having a reservoir 14 holding coating material that enters port 16, and an upper section 20 with flow channels 23 for introducing purge gases such as nitrogen or carbon dioxide. A shortcoming of this design is the critical requirement of alignment with respect to the fiber path. Misalignment will cause the fiber to rub against the apparatus, which degrades the fiber and the coating. U.S. Pat. No. 5,062,687 discloses a device for carbon coating of optical fiber using an argon purge gas. There are other known bubble stripping and coating devices for an optical fiber, see also U.S. Pat. No. 4,409,263.

There are many known coating devices for an optical fiber. For example, U.S. Pat. No. 4,531,959 discloses an apparatus for coating fibers which, as shown in FIG. 2, includes a guide die 42 and a sizing die 38 spaced apart within a cylindrical housing 30. The housing 30 has an annular slot 50 aligned with inlet ports 26 and radial bores 51 for feeding coating liquid under pressure into an inner chamber 53. A flow distribution sleeve 39 with holes 40 distributes the coating liquid around a fiber that is drawn through the two dies. The sizing die 38 has an orifice 47 having a size determined by the size of the fiber being formed, the thickness of the coating and the coating material employed. U.S. Pat. No. 5,127,361 discloses a resin coating device for an optical fiber which includes a holder 5 supporting a die 3 and a nipple 2 spaced from the die to allow a resin 4 to flow around a fiber that is being drawn, as shown in FIGS. 1–3. There are other known coating devices for an optical fiber, see also U.S. Pat. Nos. 4,374,161; 4,439,467; 4,533,570; 4,613,521.

See also United Kingdom Patent No. 2113574A, and the articles: "Cooling and Bubble-Free Coating of Optical Fibers at a High Drawing Rate", Jochem and Van Der Ligt, Journal of Lightwave Technology (1986), and "Method for Cooling and Bubble-Free Coating of Optical Fibers at High Drawing Rates", Jochem and Van Der Ligt, Electronic Letters (1985).

There are problems with using carbon dioxide, nitrogen or Freon as a bubble stripping gas. Disadvantages of using these gases include the following: Corning's U.S. Pat. No. 4,792,347 limits the availability of others to use carbon dioxide as bubble stripping gas. Nitrogen has proved to be an ineffective bubble stripping gas. Freon is a hazardous and expensive bubble stripping gas. Moreover, one important disadvantage of the known prior art is that gas other than carbon dioxide and Freon have not proved to be effective bubble stripping gases. For example, argon by itself as a replacement for carbon dioxide or Freon has shown to be inefficient in terms of eliminating bubble formation. Therefore, there is a need in the art for an innovative apparatus for bubble-stripping and coating a fiber at higher speeds with other gases, such as argon, to eliminate the need for using carbon dioxide or Freon as a bubble stripping gas.

SUMMARY OF THE INVENTION

The present invention provides a bubble stripping and coating apparatus for stripping entrained gas from a fiber, then coating the fiber with a coating material having a bubble stripping and coater body and a die assembly.

The bubble stripping and coater body has a bubble stripping gas entrance for providing a bubble stripping argon gas to a bubble stripping gas chamber for stripping entrained gas from the surface of the fiber and having a die assembly bore.

The die assembly is arranged in the die assembly bore, and has a guide die having a lower guide die opening with a diameter of less than or equal to 0.016 inches. In an embodiment, the lower guide die opening has a diameter of 0.0136 inches.

One advantage of the bubble stripping and coating apparatus is that it can apply bubble free coating at high line speeds. In addition, this design is adaptable to any coating process of fine material where bubble-free coating is important. The design also simplifies the operation of the apparatus and reduces the critical requirement of alignment.

Moreover, the invention allows for the use of argon as a bubble stripping gas. The invention requires that for argon to be an efficient bubble stripper within a pressurized coating system, the diameter of the guide die must be less than or equal to 0.016 inches for effective bubble stripping. In addition, the invention also simplifies the design for introducing the bubble stripping gas. The design allows for a chamber to be filled with argon rather than a small cylinder. This greatly benefits the manufacturing process as alignment is no longer as critical.

BRIEF DESCRIPTION OF THE DRAWINGS

The invention, both as to its organization and manner of operation, may be further understood by reference to a drawing (not drawn to scale) which includes FIGS. 1–20 taken in connection with the following description.

FIG. 3 is an exploded view of a bubble stripping and coating device which is the subject of the present application.

FIG. 4(a) is an elevation view of the guide die shown in FIGS. 1–3, and FIG. 4(b) is a cross-sectional view of the guide die shown in FIG. 4(a) along lines 4b–4b'.

DESCRIPTION OF THE BEST MODE OF THE INVENTION

Figure 1:
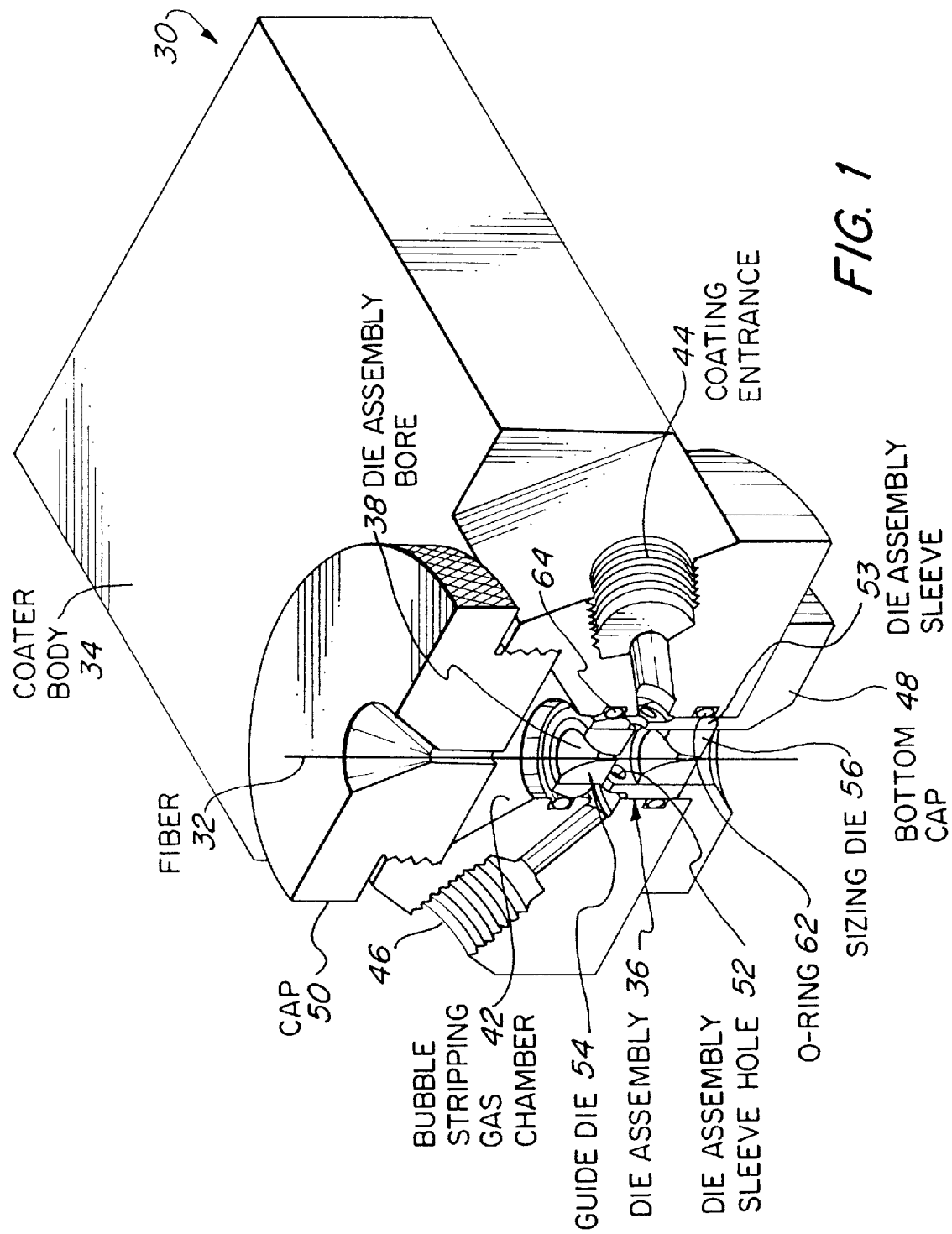
FIG. 1 is a front perspective cross-sectional view of a bubble stripping and coating device which is the subject of the present application.
Figure 2:
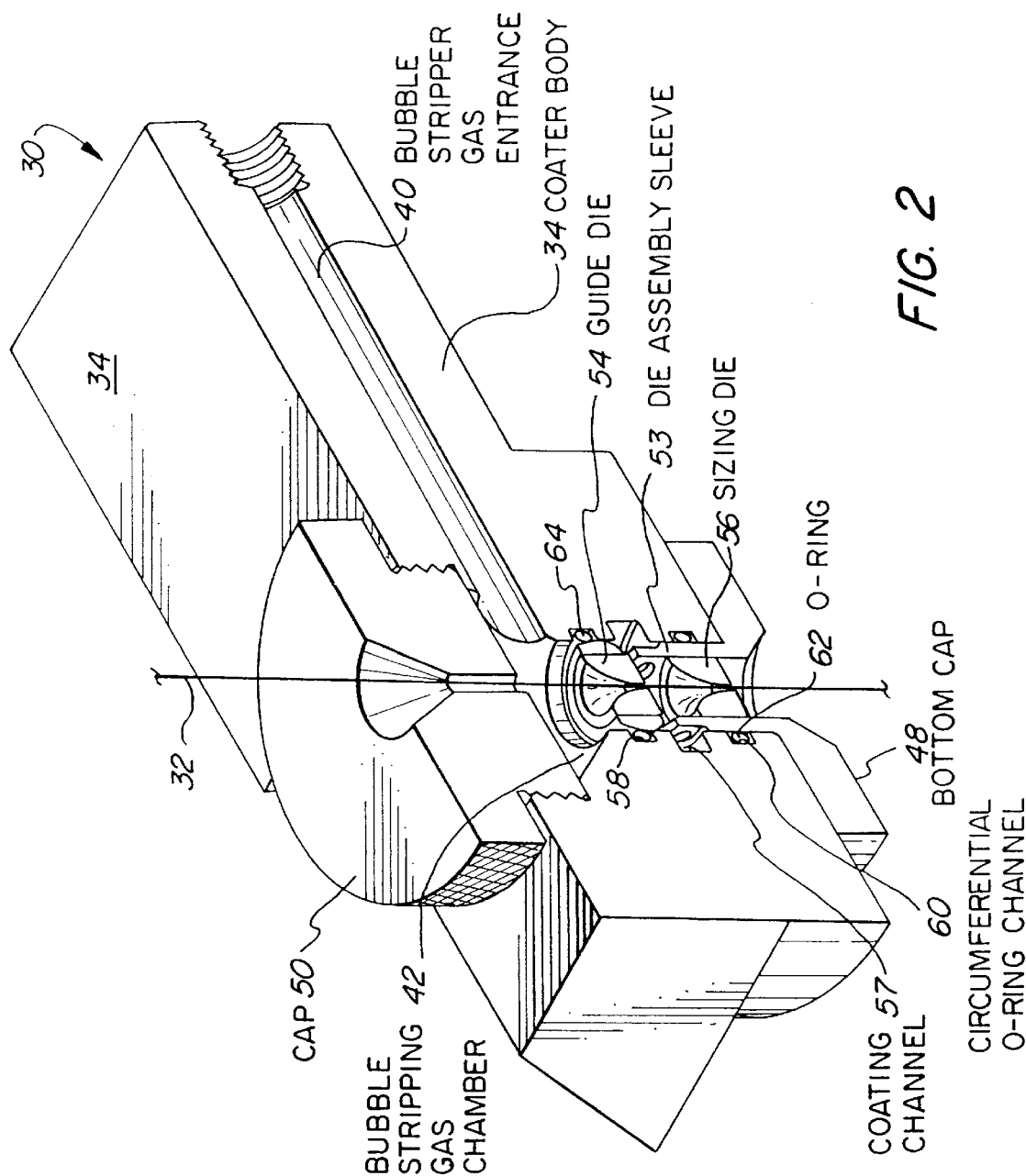
FIG. 2 is a side perspective, cross-sectional view of a bubble stripping and coating device which is the subject of the present application.
Figure 5:
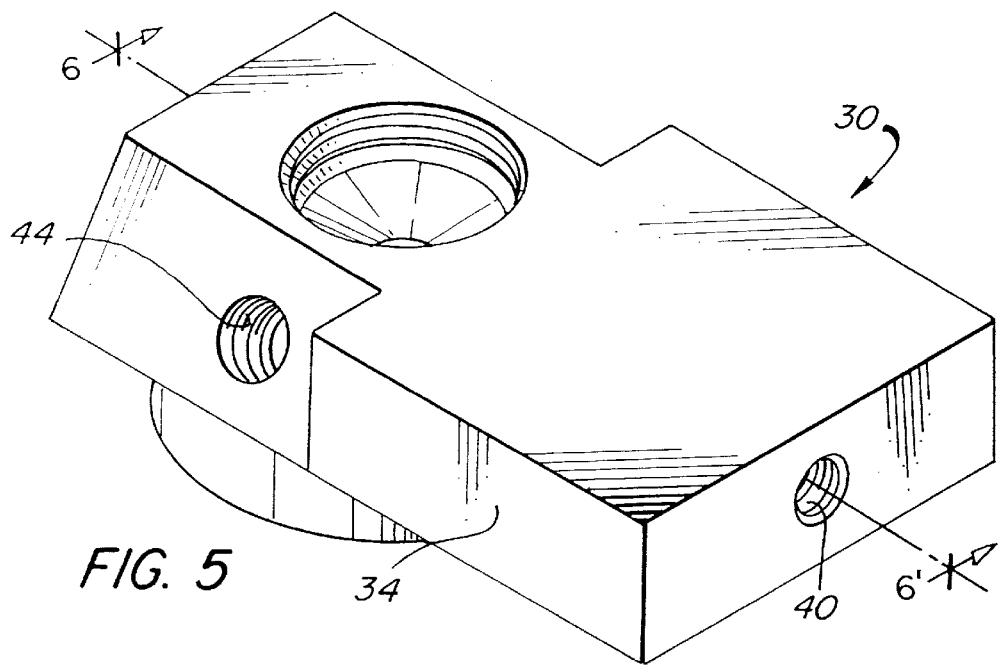
FIG. 5 is an isometric view of a coater body shown in FIG. 3.
Figure 6:
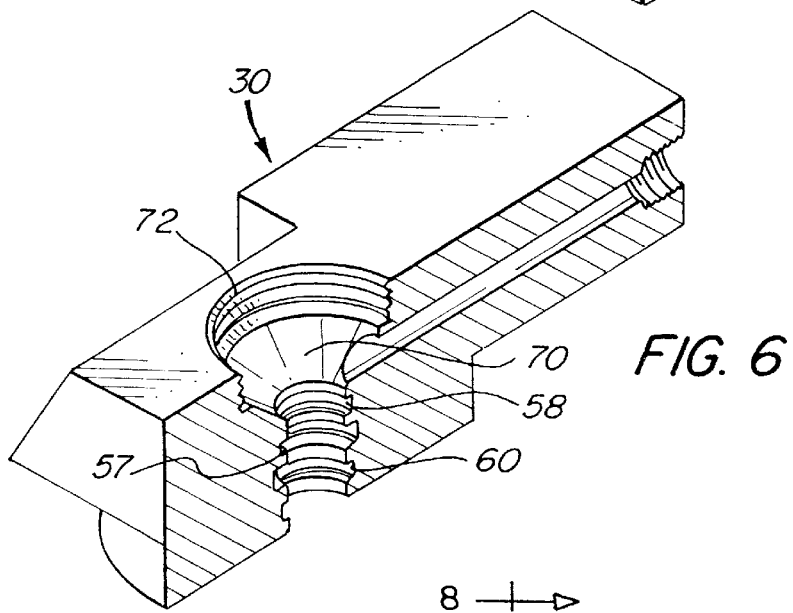
FIG. 6 is a cross-sectional view of the coater body along lines A—A in FIG. 5.
Figure 7:
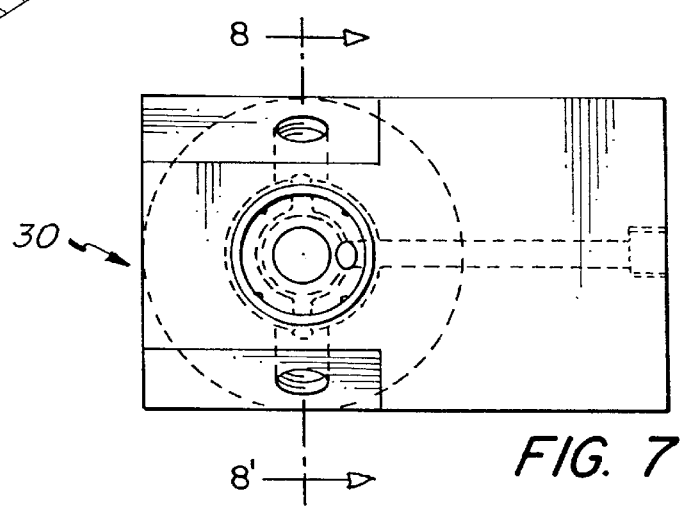
FIG. 7 is an elevational phantom view of the coater body shown in FIG. 5.
Figure 8:
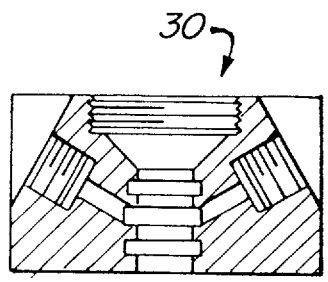
FIG. 8 is a cross-sectional view of the coater body shown in FIG. 7 along lines 8—8' rotated 90 degrees.

FIGS. 1–3 show a bubble stripping and coating device generally indicated as 30 for stripping entrained gas from a surface of a fiber 32 and coating it with a coating material (not shown) so the bubbles of gas do not get entrained between the surface of the fiber 32 and the coating material (not shown).

Figure 9:
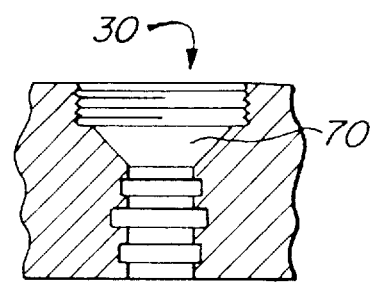
FIG. 9 is a detailed view of a portion of FIG. 8 labelled Detail A.
Figure 10:
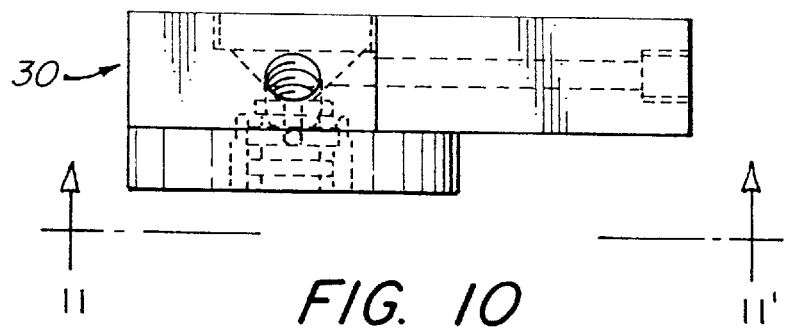
FIG. 10 is a side phantom view of the coater body shown in FIG. 5.
Figure 11:
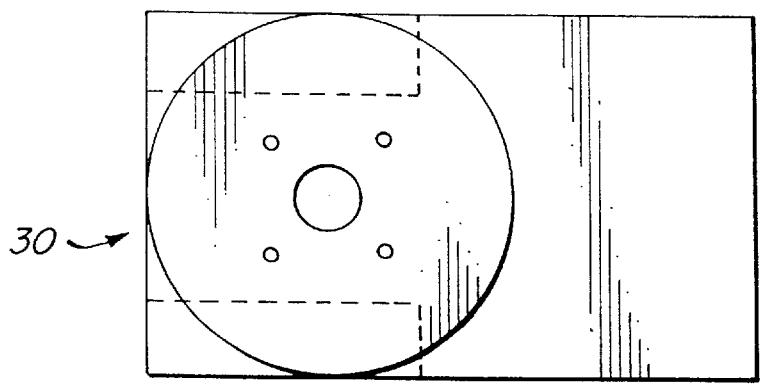
FIG. 11 is a cross-sectional view of FIG. 10 along lines 11—11'.
Figure 12:
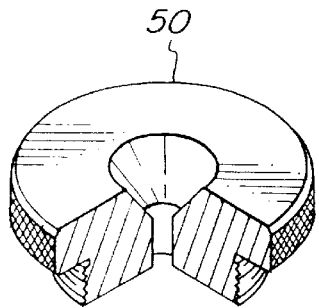
FIG. 12 is an isometric sectional view of the top cap shown in FIGS. 1–3.
Figure 13:
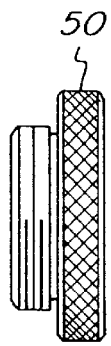
FIG. 13 is a side view of the top cap shown in FIG. 12.
Figure 14:
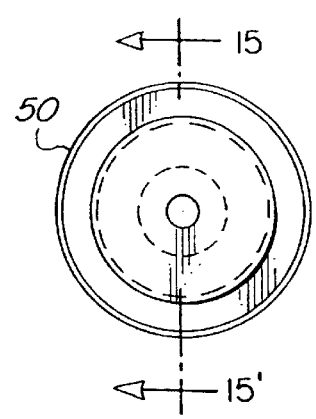
FIG. 14 is a bottom view of the top cap shown in FIG. 12.
Figure 15:
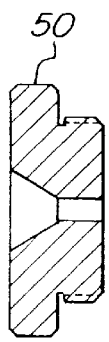
FIG. 15 is a cross-sectional view of the top cap shown in FIG. 14 along lines 15—15'.
Figure 16:
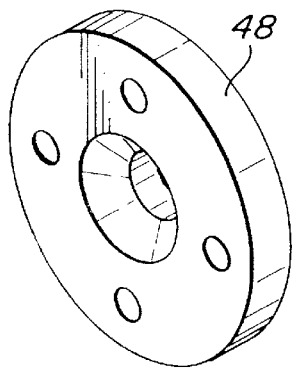
FIGS. 16 and 17 are isometric sectional views of the bottom cap shown in FIGS. 1–3.
Figure 17:
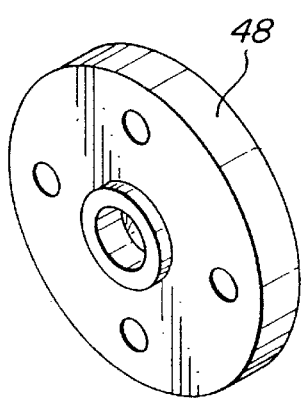
Figure 18:
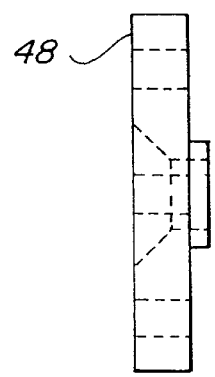
FIG. 18 is a side view of the bottom cap shown in FIGS. 16–17.
Figure 19:
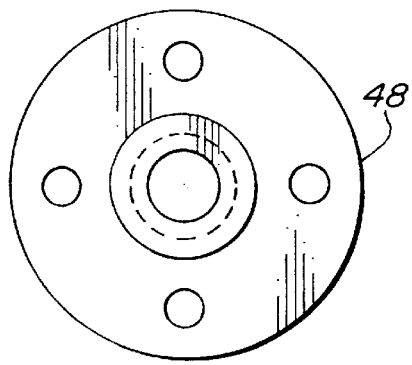
FIG. 19 is a bottom view of the bottom cap shown in FIG. 3.
Figure 20:
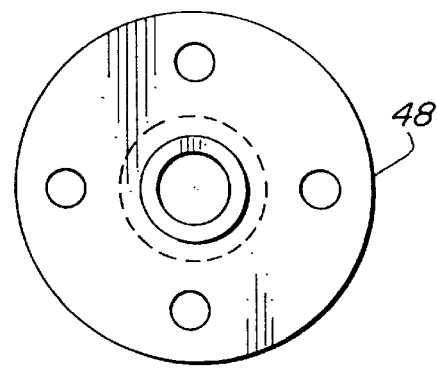
FIG. 20 is a top view of the bottom cap shown in FIG. 3.

The bubble stripping and coating device 30 has a bubble stripping and coating body 34 and a die assembly generally indicated as 36 arranged in a die assembly bore generally indicated as 38. A bubble stripper gas entrance 40 (see FIG. 2) provides the bubble stripping gas to a bubble stripping gas chamber 42. The bubble stripper gas entrance 40 simplifies the design for introducing the bubble stripping gas when compared to that known in the prior art. As shown, the bubble stripping gas chamber 42 is conically-shaped with dimensions as shown in FIG. 9, as discussed below. The design allows for a chamber to be filled with argon rather than a small cylinder. This greatly benefits the manufacturing process as alignment is no longer as critical.

The bubble stripping and coating body 34 has a dual port system for providing coating material to the die assembly bore 38, including two coating entrances 44, 46. The bubble stripping and coating device 30 also has a bottom cap 48 for supporting the die assembly 36 and a top cap 50 for enclosing the bubble stripping gas chamber 42.

The die assembly 36 has a die assembly sleeve 53 with a plurality of coating apertures generally indicated as 52. A guide die 54 and a sizing die 56 are press fit into the die assembly sleeve 53, and frictionally retained therein. The die assembly sleeve 53, the guide die 54 and the sizing die 56 are first assembled together, then arranged in the die assembly bore 38. The die assembly bore 38 has a circumferential coating channel at the end of the coating entrances 44, 46. The die assembly bore 38 also has circumferential O-ring channels 58, 60 for receiving O-rings 62, 64, that frictionally retain and seal the die assembly 36 within the die assembly bore 38. The die assembly design enables the die assembly 14 to be easily removed after each fiber run so the bubble stripping and coating device can be cleaned. In the embodiment shown, the die assembly sleeve 53 can be made of various metals, including brass, and the guide die 54 and the sizing die 56 are typically made of carbide; however, the scope of the invention is not intended to be limited to any particular materials.

FIGS. 4(a) and (b) show the guide die 54 in greater detail. The guide die 54 has a lower guide die opening with a diameter less than 0.016 inches. As shown in FIG. 4(b), the lower guide die opening has a diameter labelled as A of substantially 0.0136 inches. As shown, the guide die 54 has an upper conical guide die opening with a diameter of about 0.1875 inches. The lower guide die opening has a cylindrical height of about 0.0272 inches. The guide die has an overall height of about 0.1875 inches. The dimensions of the guide die allow for the use of argon as a bubble-stripping gas. It has been discovered that in order for argon to be an efficient bubble stripping gas within a pressurized coating system, the diameter of the guide die must be less than or equal to 0.016 inches for effective stripping. The design of the guide die 54 and the bubble stripping chamber enable the replacement of argon for $CO_2$ or Freon as a very efficient gas for eliminating bubble formation.

FIGS. 6–11 show the bubble stripping and coating chamber 42 in greater detail. The bubble stripping and coating chamber 42 has a conical surface portion 70 (FIG. 6) with a conical height $H_c$ of about 0.22 inches (FIG. 9) and a conical angle of about 45 degrees (FIG. 9). The coater body 34 has a cylindrical threaded portion 72 for receiving the cap 50.

FIGS. 12–15 show the bubble stripping gas chamber cap 50 that screws onto the bubble stripping and coater body means. The bubble stripping gas chamber cap 50 has a lower cap opening with a diameter of substantially 0.13 inches, has a cylindrical opening height of about 0.25 inches, and has an upper conical cap opening with an upper diameter of about 0.48 inches.

FIGS. 16–20 show the bottom bubble stripping gas chamber cap 50 and the various dimensions thereof.

In operation, to assemble the bubble stripping and coating apparatus 30, one must: (a) Assemble the die assembly 36 by press fitting the guide die 54 and the sizing die into the assembly sleeve 53, (b) Insert the two O-rings 62, 64, (b) Insert the die assembly 36 into the die assembly bore 38, (c) Attach the bottom cap 48, and (d) Attach the top cap 50. The apparatus can be made from various metals, including stainless steel, aluminum or brass.

As shown, the bubble stripping and coating apparatus 30 incorporates a dual feed system for coating entry. Coating lines are installed into the coater body prior to use.

The combination of the smaller diameter guide die 54 and argon results in a bubble free coating application at high line speeds. The use of a chamber for bubble-stripping rather than a small cylinder provides for easier handling and processing.

Some tests were conducted which show the effectiveness of the design, as follows:

Test #1

At a fiber draw speed of 10 meters/second, the following conditions were measured:

|  | Primary | Secondary |
|---|---|---|
| Tank temp | 45° C. | 30.6° C. |
| Line temp | 113° F. | 88° F. |
| PSI | 32 | 20 |
| Bub gas | 6 (3 LPM) | 4 (2 LPM) |
| Guide Die size | 13.6 mil | 13.6 mil |
| Cooler 1 | 15 | 15 |
| Cooler 2 | 13 | 13 |
| Cooler A | 50 | 50 |
| Coating Dia | 189 | 249 |

With these conditions there were small bubbles in the primary. Increased bubble stripper to 7 (3.5 LPM) on primary and 5 (2.5 LPM) secondary. Bubbles are gone and good concentricity was observed.

Test #2

At a fiber draw speed of 10 meters/second, the following conditions were measured:

|  | Primary | Secondary |
|---|---|---|
| Guide Die size | 13.6 | 13.6 |
| Tank | 46° C. | 30.6° C. |
| Line | 115° F. | 88° F. |
| Pressure | 32 PSI | 24 PSI |
| Bubble gas | 7.0 (3.5 LPM) | 5.0 (2.5 LPM) |
| Coating dia | 185–186 | 247–248 |

Cooler #1=19 liters/minute (after furnace)

Cooler #2=9 liters/minute (after furnace)

Cooler A=0 liters/minute (between primary and secondary coater)

No coating defects were recorded.

Other possible applications

This coating application design has demonstrated the ability to apply bubble-free coating at high line speeds. This design is adaptable to any coating process of fine material where bubble-free coating is important. The design simplifies the operation of the apparatus and reduces the critical requirement of alignment. The applications are numerous and not limited to fiber manufacturing.

It will thus be seen that the objects set forth above, and those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What we claim is:

1. A bubble stripping and coating apparatus for stripping entrained gas from a fiber, then coating the fiber with a coating material, comprising: a coater body and a die assembly, said coater body having a die assembly bore, said die assembly bore dimensioned to receive said die assembly, said coater body having an upstream and a downstream end, wherein said upstream end of said coater body includes an end cap, said die assembly being spaced from said end cap thereby defining a bubble stripping gas chamber having means for receiving argon from a source of argon, and said die assembly having an upstream end having a guide die and a downstream end having a sizing die, said guide die having an opening with a diameter of less than 0.016 inches for passage of said fiber, said guide die and said sizing die being spaced apart from each other thereby defining a coating chamber, said coating chamber having an inlet means for delivering coating material, said sizing die having an opening to pass a coated fiber therethrough.

2. A bubble stripping and coating apparatus according to claim 1, wherein the diameter of the guide die opening is substantially 0.0136 inches.

3. A bubble stripping and coating apparatus according to claim 2, wherein the guide die opening has a cylindrical height of about 0.0272 inches.

4. A bubble stripping and coating apparatus according to claim 1, wherein the guide die has an upper conical guide die opening with a diameter of about 0.1875 inches.

5. A bubble stripping and coating apparatus according to claim 1, wherein the guide die has a height of about 0.1875 inches.

6. A bubble stripping and coating apparatus according to claim 1, wherein the endcap comprises a bubble stripping gas chamber cap for substantially enclosing the bubble stripping gas chamber.

7. A bubble stripping and coating apparatus according to claim 6, wherein the bubble stripping gas chamber cap screws onto the coater body, has a lower cap opening with a diameter of substantially 0.13 inches, has a cylindrical height of about 0.25 inches, and has an upper conical cap opening with an upper diameter of about 0.48 inches.

8. A bubble stripping and coating apparatus according to claim 1, wherein the die assembly has a die assembly sleeve arranged in the die assembly bore, the die assembly sleeve having the guide die arranged therein.

9. A bubble stripping and coating apparatus according to claim 1, wherein the inlet means is comprised of a first coating entrance and a second coating entrance for providing a coating material to the die assembly bore; and wherein the die assembly has a die assembly sleeve having coating apertures and has a coating die arranged therein for coating the fiber passing through the die assembly.

10. A bubble stripping and coating apparatus according to claim 1, wherein the bubble stripping and coating apparatus further comprises a bottom cap for supporting and retaining the die assembly within the die assembly bore.

11. A bubble stripping and coating apparatus according to claim 1, wherein the die assembly bore has at least one cylindrical O-ring channel; and wherein the bubble stripping and coating apparatus has at least one O-ring arranged in said at least one cylindrical O-ring channel.

12. A bubble stripping and coating apparatus according to claim 1, wherein the bubble stripping gas chamber includes a conical surface portion with a conical height $H_c$ of about 0.22 inches and a conical angle of about 45 degrees.

13. A bubble stripping and coating apparatus for stripping entrained gas from a fiber, then coating the fiber with a coating material, comprising: a coater body and a die assembly, said coater body having a die assembly bore, said die assembly bore dimensioned to receive said die assembly, said coater body having an upstream and a downstream end, wherein said upstream end of said coater body includes an end cap, said die assembly being spaced from said end cap thereby defining a bubble stripping gas chamber having means for receiving argon from a source of argon, said coater body having first and second coating entrances for providing a coating material to the die assembly bore for coating the fiber, and said die assembly having an upstream end having a guide die and a downstream end having a sizing die, said guide die having an opening with a diameter of less than 0.016 inches for passage of said fiber, said guide die and said sizing die being spaced apart from each other thereby defining a coating chamber, said coating chamber having an inlet means for delivering coating material, said inlet means in fluid communication with said first and second coating entrances of said coater body, said sizing die having an opening to pass a coated fiber therethrough, said die assembly having a die sleeve means for securing said die assembly within said die assembly bore.

14. A bubble stripping and coating apparatus according to claim 13, wherein the guide die opening has a diameter of substantially 0.0136 inches;

wherein the guide die opening has a cylindrical height of about 0.0272 inches; and wherein the guide die has an upper conical guide die opening with a diameter of about 0.1875 inches.

15. A bubble stripping and coating apparatus according to claim 13, wherein the endcap comprises a bubble stripping gas chamber cap that screws onto the bubble stripping and coater body for enclosing the bubble stripping gas chamber.

16. A bubble stripping and coating apparatus according to claim 15, wherein the bubble stripping gas chamber cap has a lower cap opening with a diameter of substantially 0.13 inches, has a cylindrical height of about 0.25 inches, and has a conical upper cap opening with an upper diameter of about 0.48 inches.

17. A bubble stripping and coating apparatus according to claim 13, wherein the bubble stripping and coating apparatus further comprises a bottom cap for supporting and retaining the die assembly with the die assembly bore.

18. A bubble stripping and coating apparatus according to claim 13, wherein the die assembly bore has at least one cylindrical O-ring channel; and wherein the bubble stripping and coating apparatus has at least one O-ring arranged in said at least one cylindrical O-ring channel.

19. A bubble stripping and coating apparatus according to claim 13, wherein the bubble stripping gas chamber includes a conical surface portion with a conical height $H_c$ of about 0.22 inches and a conical angle of about 45 degrees.

* * * * *